(12) United States Patent
Kim

(10) Patent No.: US 8,698,459 B2
(45) Date of Patent: Apr. 15, 2014

(54) BATTERY PACK AND METHOD OF CONTROLLING THE SAME

(75) Inventor: Bong-Young Kim, Yongin-si (KR)

(73) Assignee: Samsung SDI, Co., Ltd., Gyeonggi-do (KR)

( * ) Notice: Subject to any disclaimer, the term of this patent is extended or adjusted under 35 U.S.C. 154(b) by 344 days.

(21) Appl. No.: 13/166,190

(22) Filed: Jun. 22, 2011

(65) Prior Publication Data

US 2012/0126749 A1    May 24, 2012

(30) Foreign Application Priority Data

Nov. 22, 2010    (KR) .................. 10-2010-0116215

(51) Int. Cl.
*H01M 10/46*    (2006.01)
(52) U.S. Cl.
USPC ............................................. 320/136
(58) Field of Classification Search
USPC .................. 320/107, 112, 114, 128, 134, 136
See application file for complete search history.

(56) References Cited

U.S. PATENT DOCUMENTS

| | | | |
|---|---|---|---|
| 2002/0172857 A1 | 11/2002 | Sakurai | |
| 2008/0129252 A1* | 6/2008 | Nishino | 320/162 |
| 2008/0211454 A1* | 9/2008 | Nishida | 320/106 |
| 2009/0021219 A1* | 1/2009 | Yoda et al. | 320/137 |

FOREIGN PATENT DOCUMENTS

| | | |
|---|---|---|
| JP | 09-050826 (A) | 2/1997 |
| JP | 2001-313083 (A) | 11/2001 |
| KR | 2002-0083139 (A) | 11/2002 |
| KR | 10-2003-0081934 (A) | 10/2003 |
| KR | 10-0484882 (B1) | 4/2005 |
| KR | 10-2005-0078285 (A) | 8/2005 |
| KR | 10-2006-0078030 (A) | 7/2006 |
| KR | 10-0624942 (B1) | 9/2006 |

OTHER PUBLICATIONS

Korean Notice of Allowance dated Sep. 26, 2012 for Korean Patent Application No. KR 10-2010-0116215 which corresponds to captioned U.S. Appl. No. 13/166,190.

Korean Office Action dated Feb. 27, 2012 for Korean Patent Application No. KR 10-2010-0116215 which corresponds to captioned U.S. Appl. No. 13/166,190.

* cited by examiner

*Primary Examiner* — Edward Tso
(74) *Attorney, Agent, or Firm* — Knobbe, Martens, Olson & Bear, LLP

(57) ABSTRACT

A battery pack and a method of controlling the same are disclosed. According to some aspects, the battery pack includes at least one chargeable battery cell, and a charge control circuit that receives a control signal from an external source. The charge control circuit is configured to control charging of the battery cell according to the control signal. As a result, a charging operation may be stably performed.

17 Claims, 5 Drawing Sheets

BATTERY PACK AND METHOD OF CONTROLLING THE SAME

CROSS-REFERENCE TO RELATED APPLICATIONS

This application claims the benefit of Korean Patent Application No. 10-2010-0116215, filed on Nov. 22, 2010, in the Korean Intellectual Property Office, the disclosure of which is incorporated herein in its entirety by reference.

BACKGROUND

1. Field

The disclosed technology relates to a battery pack and a method of controlling the same.

2. Description of the Related Technology

Since mobile devices, such as mobile phones, personal digital assistants (PDAs) digital cameras, tablet computers, and the like, are becoming more popular, the development of batteries for supplying power to such mobile devices has attracted greater attention from the research community.

A system for power storage in such devices is often implemented as a battery pack including a battery cell and a protection circuit for controlling charging and discharging of the battery cell. A battery pack may be directly connected to and charged by a charging unit, e.g., a plug-in adapter for using household current. Furthermore, a battery pack may also be charged when the battery pack is attached to an electronic device connected to a charger. Therefore, the development of control units integrated in electronic devices for controlling charging of battery packs and on protection circuits integrated in battery packs is of interest in order to efficiently control charging of the battery pack.

SUMMARY OF CERTAIN INVENTIVE ASPECTS

One or more embodiments include a battery pack that may be charged stably and a method of controlling the same.

According to one aspect, a battery pack is disclosed. The battery pack includes at least one chargeable battery cell, and a charge control circuit configured to receive a control signal from an external source and control charging of the at least one battery cell according to the control signal.

According to one aspect, a method of controlling a battery pack having at least one chargeable battery cell is disclosed. The method includes receiving a control signal from an external source, and controlling charging of the battery cell according to the control signal.

According to one aspect, a battery pack is disclosed. The battery pack includes at least one chargeable battery cell and a charge control circuit configured to receive a control signal from an external source and control charging of the at least one battery cell according to the control signal, wherein the circuit comprises a first switching device configured to control flow of a charging current according to the control signal. Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF CERTAIN INVENTIVE EMBODIMENTS

Figure 1:
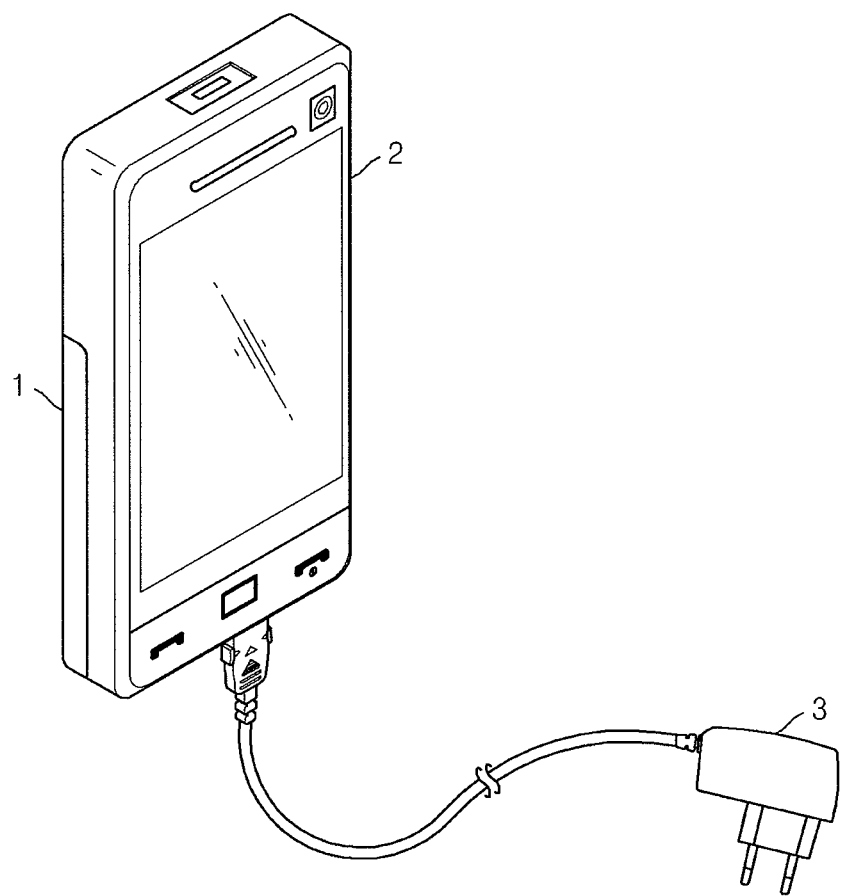
FIG. 1 is a diagram illustrating connections between a battery pack, a portable electronic device, and a charging unit.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain some aspects of the present description.

FIG. 1 is a diagram illustrating between a battery pack 1, a mobile or portable electronic device 2, and a charging unit or charger 3.

Referring to FIG. 1, the battery pack 1 may be attached to the electronic device 2, which operates on power supplied by the battery pack 1.

The electronic device 2 receives power from the battery pack 1. Alternatively, the electronic device 2 may be connected to the charging unit or charger 3 and may receive external power. Although a mobile phone is shown as the electronic device 2 in FIG. 1, the electronic device 2 is not limited thereto. For example, the electronic device 2 may be a laptop computer, personal digital assistant (PDA), digital camera, a robot cleaner, or the like.

The charger 3 converts power from an external source, such as a power grid, to provide power with voltage and current that may be supplied to the electronic device 2. The charger 3 supplies the converted power to the electronic device 2.

When the battery pack 1 is discharged and needs to be charged, power from the charger 3 is supplied to the electronic device 2, and then the electronic device 2 supplies the supplied power to the battery pack 1. In this example, a control unit integrated in the electronic device 2 controls the supply of power from the charger 3 to the battery pack 1, and thus charging of the battery pack 1 may be controlled.

Figure 2:
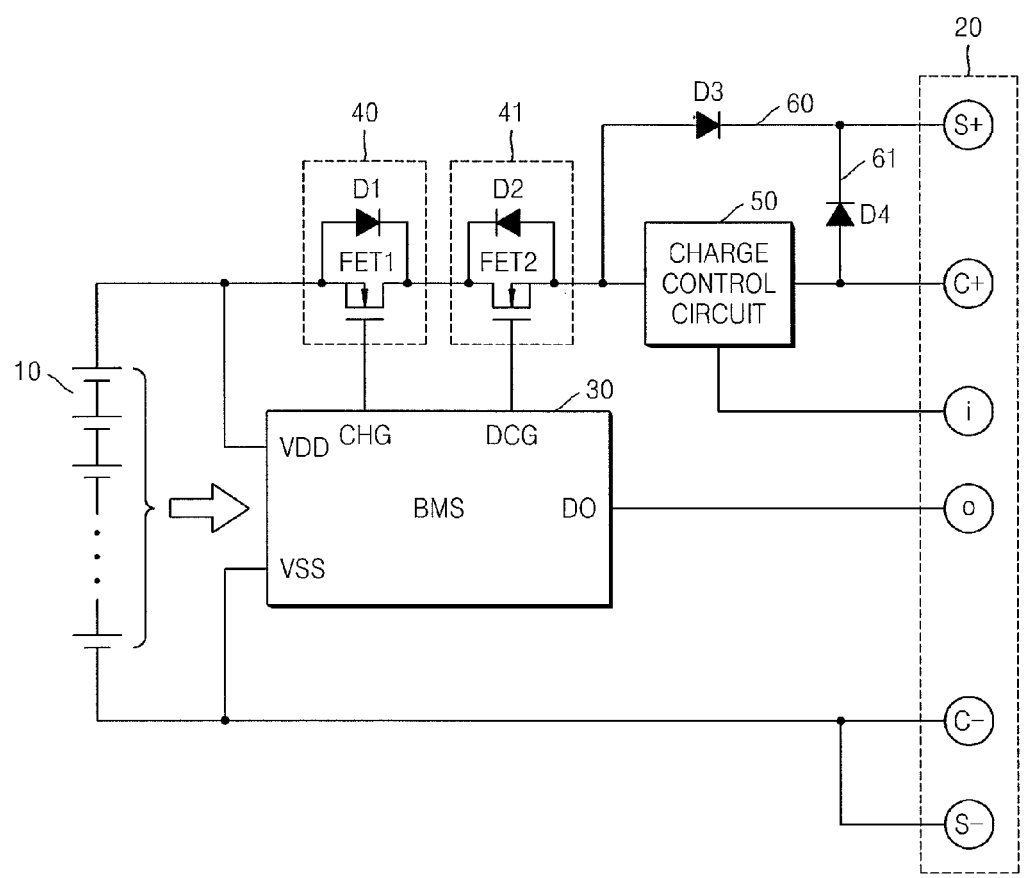
FIG. 2 is a schematic diagram illustrating a battery pack according to some embodiments.

FIG. 2 is a diagram illustrating a battery pack 1 according to some embodiments.

With reference to FIG. 2, the battery pack 1 includes at least one battery cell 10, a terminal unit 20, a battery management system (referred to hereinafter as 'BMS') 30, a charging control switch 40, a discharging control switch 41, and a charge control circuit 50.

The battery cell 10 supplies power stored therein to the electronic device 2 to which the battery pack 1 is attached. Furthermore, the battery cell 10 may be charged by external power when the charger 3 is connected to the electronic device 2 or the battery pack 1. The battery cell 10 may be a chargeable secondary battery, such as a nickel-cadmium (Ni—Cd) battery, a lead storage battery, a nickel metal hydride (NiMH) battery, a lithium ion battery, a lithium polymer battery, or the like. One or more of the battery cells 10 may be included in the battery pack 1.

The terminal unit 20 connects the battery pack 1 to an external source. For example, the external source may be the electronic device 2 or the charger 3. The terminal unit 20 may include a plurality of terminals. The terminal unit 20 may be configured to transmit and receive power, control signals, and data via the terminals. In some embodiments, the terminal unit 20 may include set terminals S+ and S− for supplying power from the battery pack 1 to the electronic device 2, charging terminals C+ and C− for receiving power from the charger 3, an output terminal "o" for outputting data or control signals, and an input terminal "i" for receiving control signals.

The BMS 30 performs functions including balancing the voltage of the battery cells 10, and controlling charging and discharging of the battery cells 10. The BMS 30 may include a power terminal VDD, a ground terminal VSS, a charging control terminal CHG, a discharging control terminal DCG, and a data output terminal DO.

Power voltage and ground voltage are applied to the power terminal VDD and the ground terminal VSS, respectively. If an abnormality in the battery pack 1 is detected, the charging control terminal CHG and the discharging control terminal DCG output a charging control signal for controlling operations of the charging control switch 40 or a discharging control signal for controlling operations of the discharging control switch 41.

The BMS 30 monitors the charge status or discharge status of the battery cells 10, status of current flow in the battery pack 1, the temperature of the battery cells 10, and other characteristics related to the performance and capacity of the battery cells 10. Furthermore, the BMS 30 may measure intermediate voltages between the battery cells 10.

The BMS 30 controls cell balancing, charging, and discharging according to a result of monitoring the condition of the battery cells 10 or a result of the measurement of the intermediate voltages between the battery cells 10. Furthermore, the BMS 30 transmits a monitoring result or a measurement result to an external source via the data output terminal DO. That is, data indicating charging status or discharging status, may be transmitted to an external source via the data output terminal DO. Although not shown in FIG. 2, the BMS 30 may further include terminals for measuring charging status or discharging status and/or terminals for monitoring charging status, discharging status, or status of current flow.

Although the BMS 30 controls all of the components in the battery pack 1 according to some embodiments, the present invention is not limited thereto. For example, the battery pack 1 may further include an analog front end (not shown) for measuring voltage of the battery cells 10 or of a single battery cell, and controlling the charging control switch 40 and the discharging control switch 41. The BMS 30 may be configured to control the operation of the analog front end.

Each of the charging control switch 40 and the discharging control switch 41 includes a field effect transistor (FET) and a parasitic diode. The charging control switch 40 includes an FET FET1 and a parasitic diode D1, whereas the discharging control switch 41 includes an FET FET2 and a parasitic diode D2.

The FET FET1 of the charging control switch 40 is connected and configured to limit flow of a current from the positive charging terminal C+ to the battery cell 10 or from the battery cell 10 to the negative charging terminal C−. The FET FET2 of the discharging control switch 41 is connected and configured to limit flow of a current from the battery cell 10 to the positive set terminal S+ or from the negative set terminal S− to the battery cell 10. Here, any of various types of switching devices other than an FET may be used as the charging control switch 40 and the discharging control switch 41.

The charge control circuit 50 controls charging of the battery pack 1 according to a control signal received from an external source. The charge control circuit 50 may be formed on a high current path formed between the charging terminals C+ and C− and the battery cell 10.

Furthermore, the battery pack 1 according to the some embodiments may include a plurality of paths for supplying power to the electronic device 2.

A first path 60 is a path for supplying power from the battery cell 10 to the electronic device 2 and is formed between the high current path and the positive set terminal S+. A diode D3 for preventing backflow of a current may be formed on the first path 60.

A second path 61 is a path for supplying power from the charger 3 to the electronic device 2 and is formed between the high current path and the positive set terminal S+. A diode D4 for preventing backflow of a current may be formed on the second path 61. The second path 61 may be formed to connect a node between the charge control circuit 50 and the positive charging terminal C+ to the positive set terminal S+. The second path 61 may be configures such that power may be supplied to the electronic device 2 even if current flow is blocked by the charge control circuit 50.

Hereinafter, a configuration of the charge control circuit 50 will be described in greater detail.

Figure 3:
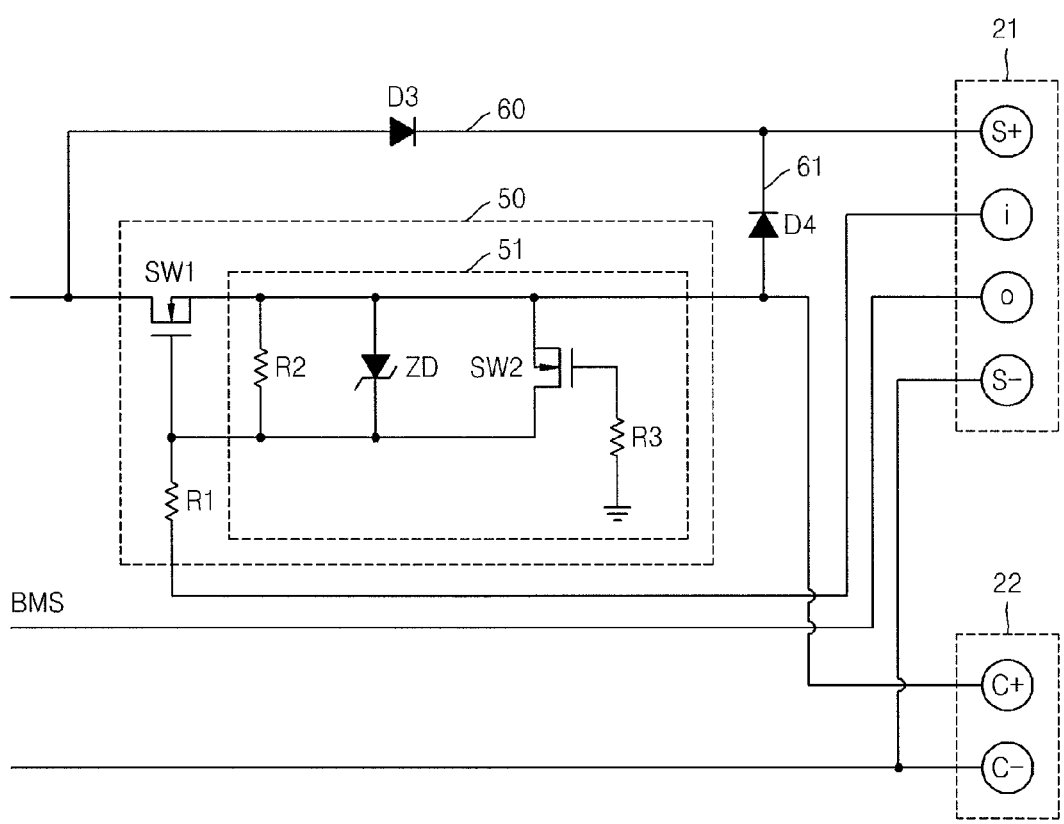
FIG. 3 is a schematic diagram illustrating a charge control circuit according to some embodiments.

FIG. 3 is a diagram illustrating the charge control circuit 50 according to some embodiments.

With reference to FIG. 3, the charge control circuit 50 includes a first switching device SW1 and an anti-reverse charging circuit 51.

The first switching device SW1 controls flow of a current between the positive charging terminal C+ and the discharging control switch 41. A first electrode and a second electrode of the first switching device SW1 are electrically connected to the positive charging terminal C+ and the positive terminal of the battery cell 10, respectively. A control signal from the input terminal "i" is applied to a control electrode of the first switching device SW1. A switching operation of the first switching device SW1 is controlled according to the applied control signal. A control signal applied from the input terminal "i" is a control signal transmitted from the electronic device 2. A resistor R1 may be arranged between the input terminal "i" and the control electrode. As illustrated in FIG. 3, an FET may be used as the first switching device SW1. The first electrode may be a source electrode, the second electrode may be a drain electrode, and the control electrode may be a gate electrode of the FET. Although an N-channel transistor is used as the first switching device SW1, the present invention is not limited thereto. For example, a P-channel transistor or the like may be used as the first switching device.

The various components of the battery pack 1 are generally controlled by the BMS 30. However, according to some embodiments, the components may be controlled by control signals transmitted from the electronic device 2, and thus charging of the battery cell 10 may be controlled by the electronic device 2.

The anti-reverse charging circuit 51 prevents the first switching device SW1 from being damaged when the charger 3 is connected to the charging terminals C+ and C− and polarities are mismatched. Furthermore, the anti-reverse charging circuit 51 protects the first switching device SW1 from surge current and electrostatic discharge (ESD).

The anti-reverse charging circuit 51 may include a resistor R2, a zener diode ZD, and the second switching device SW2. The resistor R2 and the zener diode ZD are connected in parallel between the positive charging terminal C+ and the control electrode of the first switching device SW1. A first electrode and a second electrode of the second switching device SW2 are connected between the positive charging terminal C+ and the control electrode of the first switching device SW1, and a control electrode of the second switching device SW2 is connected to ground. As illustrated in FIG. 3, a resistor R3 may be arranged between the control electrode of the second switching device SW2 and ground. An FET may be used as the second switching device SW2, the first electrode may be a source electrode, the second electrode may be a drain electrode, and the control electrode may be a gate electrode. Although an N-channel transistor is used as the second switching device SW2, the present invention is not limited thereto. For example, a P-channel transistor or the like may be used as the second switching device.

If ESD is generated around the positive charging terminal C+, a voltage exceeding a breakdown voltage is applied to the zener diode ZD. Therefore, a current flows in the zener diode ZD, and thus energy is emitted via the resistor R2.

If the charger 3 is connected to the charging terminals C+ and C− and polarities are mismatched, a negative voltage is applied to the first electrode of the second switching device SW2, and thus the second switching device SW2 is turned on. Thus, potentials of the first electrode and the control electrode of the first switching device SW1 become identical to each other. As a result, the first switching device SW1 is turned off. With the first switching device SW1 in an off state, charging of the battery cell 10 is automatically stopped.

Meanwhile, according to some embodiments, since operations of the first switching device SW1 are controlled according to control signals from the electronic device 2, data output by the BMS 30 is transmitted to the electronic device 2. For example, data indicating charging status is transmitted to the electronic device 2. Therefore, the set terminals S+ and S−, the output terminal "o", and the input terminal "i" may be connected to the electronic device 2 as a set terminal unit 21. Furthermore, the charging terminals C+ and C− may be connected to the charger 3 as a charging terminal unit 22.

Figure 4:
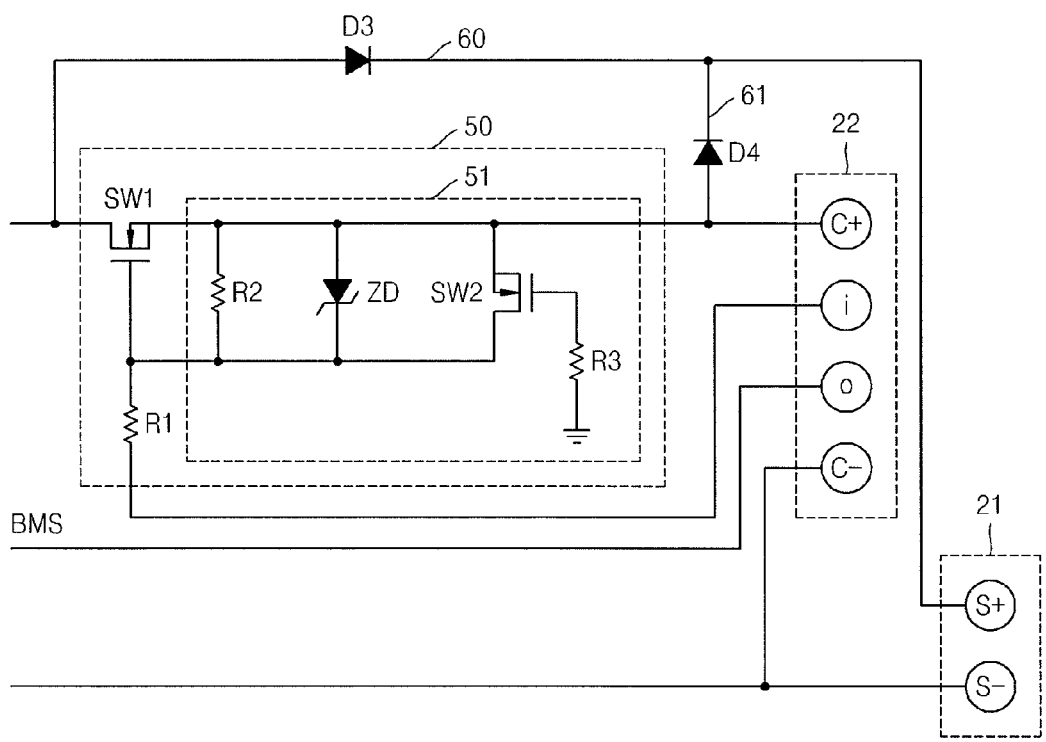
FIG. 4 is a schematic diagram illustrating a charge control circuit according to some embodiments.

FIG. 4 is a diagram illustrating the charge control circuit 50 according to some embodiments. Since the circuit configuration shown in FIG. 4 is similar to that shown in FIG. 3, only differences therebetween will be described below.

Referring to FIG. 4, a control signal from the input terminal "i" is applied to the control electrode of the first switching device SW1, and a switching operation of the first switching device SW1 is controlled according to the control signal. Here, the control signal applied from the input terminal "i" is a control signal transmitted from the charger 3.

Components of the battery pack 1 are generally controlled by the BMS 30. However, according to some embodiments, the components may be controlled by control signals transmitted from the charger 3, and thus charging of the battery cell 10 may be controlled by the charger 3.

Meanwhile, according to some embodiments, since operations of the first switching device SW1 are controlled according to control signals from the charger 3, data output by the BMS 30 including data indicating charging status is transmitted to the charger 3. Therefore, the set terminals S+ and S are configured as the set terminal unit 21. Furthermore, the charging terminals C+ and C−, the output terminal "o", and the input terminal "i" may be connected to the electronic device 2 as the charging terminal unit 22. Furthermore, according to some embodiments, since the charger 3 controls charging of the battery pack 1, it is not necessary to attach the battery pack 1 to the electronic device 2.

Figure 5:
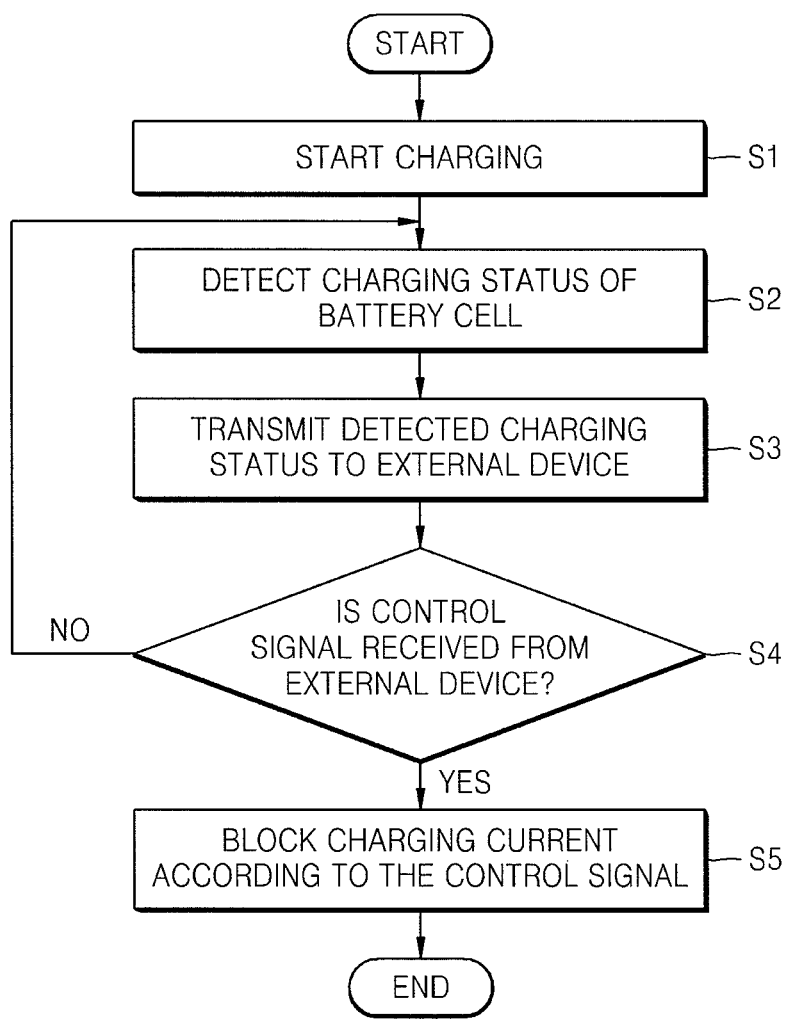
FIG. 5 is a flowchart illustrating a method of controlling a battery pack according to some embodiments.

FIG. 5 is a flowchart illustrating a method of controlling the battery pack 1.

With reference to FIG. 5, when the charger 3 is connected to the battery pack 1, or the electronic device 2, the battery pack 1 begins to be charged as represented by block S1.

A control device, such as BMS 30, detects charging status, discharging status, and intermediate voltages of the battery cells 10 as illustrated by block S2. The control device, such as BMS 30, transmits results of the detection to an external source as illustrated by block S3. The external source may be at least one of the electronic device 2 and the charger 3. The results of the detection may be transmitted to at least one external source that controls charging of the battery pack 1.

At decision block S4, it is determined whether a control signal for controlling charging of the battery pack 1 is received from the external source. If a control signal is not received, the process returns to the block S2, and the operation of charging and detecting parameters including charging status are repeated.

On the contrary, if a control signal is received from the external source, an inflowing charging current is blocked according to the control signal, and thus the overall charging process is terminated as illustrated by block S5.

According to one or more embodiments, a battery pack includes at least one chargeable battery cell; and a charge control circuit configured to receive a control signal from an external source and control charging of the battery cell according to the control signal.

The charge control circuit may include a first switching device that controls flow of a charging current according to the control signal. The charge control circuit may also include an anti-reverse charging circuit.

The battery pack may further include a battery management system (BMS) that is configured to transmit a charging status of the battery cell to the external source.

The battery pack may further include a terminal unit connected to a charger. The first switching device may include a first electrode electrically connected to the terminal unit, a second electrode electrically connected to an electrode of the battery cell, and a control electrode to which the control signal may be applied.

The charge control circuit may further include a second switching device. The second switching device may include a first electrode connected to the first electrode of the first switching device, a second electrode connected to the control electrode of the first switching device, and a control electrode connected to ground.

The charge control circuit may further include a zener diode connected between the first electrode and the control electrode of the first switching device.

A first path through which power is supplied from the battery cell to an electronic device employing the battery pack may be formed. Furthermore, a second path through which power is supplied from the terminal unit to the electronic device employing the battery pack may be formed.

The external source may be the electronic device employing the battery pack. Additionally or alternatively, the external source may be the charger.

According to one or more embodiments, a method of controlling a battery pack having at least one chargeable battery cell is disclosed. The method includes receiving a control signal from an external source; and controlling charging of the battery cell according to the control signal.

The method may further include detecting charging status of the battery cell, and transmitting the detected charging status to the external source. The method may further include, if the battery cell is fully charged, blocking a charging current flowing from a charger to the battery cell according to the control signal.

The method may further include, if the battery cell is fully discharged, supplying power from a charger to an electronic device employing the battery pack.

The method may further include, if the battery cell is fully charged, supplying power stored in the battery cell, power from a charger, or both to an electronic device including the battery pack.

As described above, according to the one or more of the above embodiments of the present invention, charging of the battery pack 1 may be controlled not only by the BMS 30 included in the battery pack 1, but also by external sources, such as the electronic device 2 or the charger 3. Therefore, a charging process may be performed stably.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack comprising:
    at least one chargeable battery cell;
    a charging terminal;
    a set terminal;
    a charging control switch connected to the battery cell and the charging terminal, the charging control switch configured to control flow of a charging current from the charging terminal to the battery cell;
    a discharging control switch connected to the battery cell and the set terminal configured to control flow of a discharge current from the battery cell to the set terminal;
    a smart control circuit connected between the charging terminal and the charging control switch, the smart control circuit receiving a control signal from an external device to control charging of the battery cell according to the control signal, the smart control circuit comprising a first switching device configured to control flow of a charging current according to the control signal.

2. The battery pack of claim 1, wherein the charge control circuit comprises an anti-reverse charging circuit, and wherein the anti-reverse charging circuit is configured to protect the first switching device from damage.

3. The battery pack of claim 1, further comprising a battery management system (BMS) that transmits charging status of the battery cell to the external device.

4. The battery pack of claim 1, wherein the first switching device comprises:
    a first electrode electrically connected to the charging terminal;
    a second electrode electrically connected to an electrode of the battery cell; and
    a control electrode to which the control signal is applied.

5. The battery pack of claim 4, wherein the smart control circuit further comprises a second switching device,
    wherein the second switching device comprises:
    a first electrode connected to the first electrode of the first switching device;
    a second electrode connected to the control electrode of the first switching device; and
    a control electrode connected to ground.

6. The battery pack of claim 4, wherein the smart control circuit further comprises a zener diode connected between the first electrode and the control electrode of the first switching device.

7. The battery pack of claim 4, wherein a first path through which power is supplied from the battery cell to an electronic device employing the battery pack is formed.

8. The battery pack of claim 4, wherein a second path through which power is supplied from the terminal unit to the electronic device employing the battery pack is formed.

9. The battery pack of claim 1, wherein the external device is the electronic device employing the battery pack.

10. The battery pack of claim 1, wherein the external device is the charger.

11. A method of controlling the battery pack of claim 1, the method comprising:
    receiving a control signal from an external device; and
    operating the first switching device to control charging of the battery cell according to the control signal.

12. The method of claim 11, further comprising:
    detecting charging status of the battery cell; and
    transmitting the detected charging status to the external device.

13. The method of claim 12, further comprising, if the battery cell is fully charged, blocking a charging current flowing from a charger to the battery cell according to the control signal.

14. The method of claim 12, further comprising, if the battery cell is fully discharged, supplying power from a charger to an electronic device employing the battery pack.

15. The method of claim 12, further comprising, if the battery cell is fully charged, supplying power stored in the battery cell, power from a charger, or both to an electronic device employing the battery pack.

16. A battery pack comprising:
    at least one chargeable battery cell;
    a charging terminal;
    a set terminal;
    a charging control switch connected to the battery cell and the charging terminal, the charging control switch configured to control flow of a charging current from the charging terminal to the battery cell;
    a discharging control switch connected to the battery cell and the set terminal configured to control flow of a discharge current from the battery cell to the set terminal;
    a battery management system (BMS) configured to control the charging control switch and the discharging control switch to control charging and discharging of the at least one battery cell; and
    a charge control circuit connected between the charging terminal and the charging control switch, the charge control circuit configured to receive a control signal from an external source and control charging of the at least one battery cell according to the control signal, wherein the charge control circuit comprises a first switching device configured to control flow of a charging current according to the control signal.

17. The battery pack according to claim 16, wherein the first switching device is configured to control flow of a charging current between the charging terminal and the at least one battery cell according to the control signal.

* * * * *